US012612151B2

(12) United States Patent
Gonzalez et al.

(10) Patent No.: US 12,612,151 B2
(45) Date of Patent: *Apr. 28, 2026

(54) DYNAMICALLY TUNED TAIL ASSEMBLIES FOR ROTORCRAFT

(71) Applicant: Textron Innovations Inc., Providence, RI (US)

(72) Inventors: Manuel Adrian Gonzalez, Plano, TX (US); George Ryan Decker, Fort Worth, TX (US); Robert Anthony Veltre, III, Irving, TX (US)

(73) Assignee: Textron Innovations Inc., Providence, RI (US)

( * ) Notice: Subject to any disclaimer, the term of this patent is extended or adjusted under 35 U.S.C. 154(b) by 0 days.

This patent is subject to a terminal disclaimer.

(21) Appl. No.: 19/172,421

(22) Filed: Apr. 7, 2025

(65) Prior Publication Data

US 2025/0276785 A1      Sep. 4, 2025

Related U.S. Application Data

(63) Continuation of application No. 18/591,466, filed on Feb. 29, 2024, now Pat. No. 12,434,809.

(51) Int. Cl.
*B64C 5/02* (2006.01)
*B64C 5/10* (2006.01)
*B64C 29/00* (2006.01)

(52) U.S. Cl.
CPC .................. *B64C 5/02* (2013.01); *B64C 5/10* (2013.01); *B64C 29/0033* (2013.01)

(58) Field of Classification Search
CPC .... B64C 5/02; B64C 5/06; B64C 5/10; B64C 1/26; B64C 9/08; B64C 9/30
See application file for complete search history.

(56) References Cited

U.S. PATENT DOCUMENTS

| | | |
|---|---|---|
| 2,580,176 A | 12/1951 | Johnson |
| 2,708,081 A | 5/1955 | Dobson |
| 3,039,719 A | 6/1962 | Platt |
| 3,166,271 A | 1/1965 | Zuck |
| 4,247,061 A | 1/1981 | Kuczynski et al. |
| 5,096,143 A | 3/1992 | Nash |
| 5,395,073 A | 3/1995 | Rutan et al. |
| 5,549,260 A | 8/1996 | Reed, III |
| 5,641,133 A | 6/1997 | Toossi |
| 7,581,696 B2 | 9/2009 | Morgan et al. |
| 8,006,932 B2 | 8/2011 | Honorato Ruiz et al. |
| 8,342,446 B2 | 1/2013 | Chareyre et al. |
| 9,174,731 B2 | 11/2015 | Ross et al. |
| 9,376,206 B2 | 6/2016 | Ross et al. |
| 9,616,995 B2 | 4/2017 | Watkins |
| 10,023,294 B2 | 7/2018 | VanBuskirk et al. |

(Continued)

*Primary Examiner* — William L Gmoser

(74) *Attorney, Agent, or Firm* — Lawrence Youst PLLC

(57) ABSTRACT

A tail assembly for a rotorcraft having a fuselage. The tail assembly includes a stabilizer having an aft spar and a forward spar. An aft joint couples the aft spar to the fuselage and defines a pitch axis such that the aft joint allows the stabilizer to pivot about the pitch axis. A forward joint couples the forward spar to the fuselage. The forward joint has an axial stiffness configured to tailor a chordwise pivot mode of the stabilizer and a bending stiffness configured to tailor a beamwise bending mode of the stabilizer. The chordwise pivot mode of the stabilizer is decoupled from the beamwise bending mode of the stabilizer.

20 Claims, 7 Drawing Sheets

(56)         References Cited

U.S. PATENT DOCUMENTS

| | | | |
|---|---|---|---|
| 11,319,055 | B2 | 5/2022 | Decker et al. |
| 11,603,183 | B2 | 3/2023 | Decker et al. |
| 2010/0032519 | A1 | 2/2010 | Chareyre et al. |
| 2010/0148000 | A1 | 6/2010 | Llamas Sandin et al. |
| 2016/0368621 | A1 | 12/2016 | Lueder |
| 2022/0017205 | A1 | 1/2022 | Vingiani et al. |

DYNAMICALLY TUNED TAIL ASSEMBLIES FOR ROTORCRAFT

CROSS-REFERENCE TO RELATED APPLICATIONS

The present application is a continuation of co-pending application Ser. No. 18/591,466 filed Feb. 29, 2024.

GOVERNMENT RIGHTS

This invention was made with Government support under Agreement No. W31P4Q-18-D-0002 W31P4Q21F0285, awarded by the Army Contracting Command-Redstone Arsenal. The Government has certain rights in the invention.

TECHNICAL FIELD OF THE DISCLOSURE

The present disclosure relates, in general, to tail assemblies for rotorcraft and, in particular, to tail assembly stabilizers that are coupled to the fuselage of the rotorcraft such that the chordwise pivot mode and the beamwise bending mode of the stabilizers are tailored and decoupled from each other to provide mode tuning relative to rotorcraft excitation frequencies.

BACKGROUND

Tiltrotor aircraft typically include multiple propulsion assemblies that are positioned near outboard ends of a fixed wing. Each propulsion assembly may include an engine and transmission that provide torque and rotational energy to rotate a proprotor assembly including a rotor hub and a plurality of proprotor blades. Typically, at least a portion of each propulsion assembly is rotatable relative to the fixed wing such that the proprotor blades have a generally horizontal plane of rotation providing vertical thrust for takeoff, hovering and landing, much like a conventional helicopter, and a generally vertical plane of rotation providing forward thrust for cruising in forward flight with the fixed wing providing lift, much like a conventional propeller driven airplane.

Physical structures have natural frequencies or modes that can be excited by forces applied thereto such as driving forces generated by rotating components. These modes are determined, at least in part, by the materials and geometries of the structures. In the case of tiltrotor aircraft, designers must consider the dynamic response of structures, such as the fuselage and the tail assembly, to the excitation frequencies generated by the rotating proprotor assemblies. For example, the stiffness of the connection between the tail structure and the fuselage has a significant impact on the modes of the tail structure, which should be sufficiently separated from the proprotor excitation frequencies. Attempts have been made to soften the connection between the tail structure and the fuselage to lower a chordwise pivot mode of the tail structure. It has been found, however, that such softened connections may result in an undesirable coupling of the chordwise pivot mode and a beamwise bending mode of the tail structure.

SUMMARY

In a first aspect, the present disclosure is directed to a tail assembly for a rotorcraft having a fuselage and a rotor assembly that generates first and second excitation frequencies. The tail assembly includes a stabilizer having an aft spar and a forward spar. An aft joint couples the aft spar to the fuselage and defines a pitch axis such that the aft joint allows the stabilizer to pivot about the pitch axis. A forward joint couples the forward spar to the fuselage. The forward joint has an axial stiffness configured to tailor a chordwise pivot mode of the stabilizer and a bending stiffness configured to tailor a beamwise bending mode of the stabilizer. The chordwise pivot mode of the stabilizer is below the first excitation frequency, the beamwise bending mode of the stabilizer is above the second excitation frequency and the chordwise pivot mode of the stabilizer is decoupled from the beamwise bending mode of the stabilizer.

In certain embodiments, the aft joint may include a clevis fitting coupled to the aft spar and a lug fitting coupled to the fuselage with the clevis fitting and the lug fitting coupled together by at least one spherical bearing assembly such that the clevis fitting and the lug fitting allow the stabilizer to pivot about the pitch axis. In some embodiments, the aft joint may include a clevis fitting coupled to the aft spar and a lug fitting coupled to the fuselage with the clevis fitting and the lug fitting coupled together by first and second spherical bearing assemblies such that the clevis fitting and the lug fitting allow the stabilizer to pivot about the pitch axis. In certain embodiments, the forward joint may include a shaft coupled to the forward spar by first and second outboard bearings and coupled to the fuselage by first and second inboard bearings with the shaft having an axis extending in an axial direction. In such embodiment, the shaft may be a generally cylindrical hollow shaft such as a generally cylindrical tapered hollow shaft. Also, in such embodiment, the shaft may be formed from a metal.

In some embodiments, the first and second outboard bearings may be spherical bearings while the first and second inboard bearings may be elastomeric journal bearings. In such embodiments, the elastomeric journal bearings may define the axial stiffness of the forward joint and allow axial motion of the shaft relative to the fuselage when the stabilizer pivots about the pitch axis. In addition, the shaft and the elastomeric journal bearings may define the bending stiffness of the forward joint and allow beamwise bending motion of the stabilizer. In certain embodiments, the axis of the shaft may be tangent to an arc of rotation about the pitch axis at a location between the elastomeric journal bearings. In some embodiments, the axis of the shaft may be tangent to an arc of rotation about the pitch axis at a location between the first and second inboard bearings. In certain embodiments, the axis of the shaft may be tangent to an arc of rotation about the pitch axis at a location inboard of the first and second outboard bearings. In some embodiments, the first and second outboard bearings may be elastomeric journal bearings and the first and second inboard bearings may be spherical bearings. In certain embodiments, the first excitation frequency may be a n/rev frequency, where n is a number of rotor blades of the rotor assembly such as a 3/rev frequency. In some embodiments, the second excitation frequency may be a 1/rev frequency.

In a second aspect, the present disclosure is directed to a rotorcraft that includes a fuselage and a rotor assembly that is rotatably coupled to the fuselage and is operable to generate first and second excitation frequencies. A tail assembly is coupled to the fuselage. The tail assembly includes a stabilizer having an aft spar and a forward spar. An aft joint couples the aft spar to the fuselage and defines a pitch axis such that the aft joint allows the stabilizer to pivot about the pitch axis. A forward joint couples the forward spar to the fuselage. The forward joint has an axial stiffness configured to tailor a chordwise pivot mode of the stabilizer and a bending stiffness configured to tailor a beamwise bending mode of the stabilizer. The chordwise pivot mode of the stabilizer is below the first excitation frequency, the beamwise bending mode of the stabilizer is above the second excitation frequency and the chordwise pivot mode of the stabilizer is decoupled from the beamwise bending mode of the stabilizer. In certain embodiments, the tail assembly may be a V-tail assembly.

In a third aspect, the present disclosure is directed to a tiltrotor aircraft having a helicopter flight mode and an airplane flight mode. The tiltrotor aircraft includes a fuselage and a wing that is coupled to the fuselage. First and second pylon assemblies are rotatable coupled to the wing and are configured to selectively operate the tiltrotor aircraft between the helicopter flight mode and the airplane flight mode. Each pylon assembly includes a proprotor assembly operable to generate first and second excitation frequencies. A tail assembly is coupled to the fuselage. The tail assembly includes a stabilizer having an aft spar and a forward spar. An aft joint couples the aft spar to the fuselage and defines a pitch axis such that the aft joint allows the stabilizer to pivot about the pitch axis. A forward joint couples the forward spar to the fuselage. The forward joint has an axial stiffness configured to tailor a chordwise pivot mode of the stabilizer and a bending stiffness configured to tailor a beamwise bending mode of the stabilizer. The chordwise pivot mode of the stabilizer is below the first excitation frequency, the beamwise bending mode of the stabilizer is above the second excitation frequency and the chordwise pivot mode of the stabilizer is decoupled from the beamwise bending mode of the stabilizer.

BRIEF DESCRIPTION OF THE DRAWINGS

For a more complete understanding of the features and advantages of the present embodiments, reference is now made to the detailed description along with the accompanying figures in which corresponding numerals in the different figures refer to corresponding parts and in which.

DETAILED DESCRIPTION

While the making and using of various embodiments of the present disclosure are discussed in detail below, it should be appreciated that the present disclosure provides many applicable inventive concepts, which can be embodied in a wide variety of specific contexts. The specific embodiments discussed herein are merely illustrative and do not delimit the scope of the present disclosure. In the interest of clarity, all features of an actual implementation may not be described in this specification. It will of course be appreciated that in the development of any such actual embodiment, numerous implementation-specific decisions must be made to achieve the developer's specific goals, such as compliance with system-related and business-related constraints, which will vary from one implementation to another. Moreover, it will be appreciated that such a development effort might be complex and time-consuming but would nevertheless be a routine undertaking for those of ordinary skill in the art having the benefit of this disclosure.

In the specification, reference may be made to the spatial relationships between various components and to the spatial orientation of various aspects of components as the devices are depicted in the attached drawings. However, as will be recognized by those having ordinary skill in the art after a complete reading of the present disclosure, the devices, members, apparatuses, and the like described herein may be positioned in any desired orientation. Thus, the use of terms such as "above," "below," "upper," "lower" or other like terms to describe a spatial relationship between various components or to describe the spatial orientation of aspects of such components should be understood to describe a relative relationship between the components or a spatial orientation of aspects of such components, respectively, as the devices described herein may be oriented in any desired direction. As used herein, the term "coupled" may include direct or indirect coupling by any means, including by mere contact or by moving and/or non-moving mechanical connections.

Figure 1A:
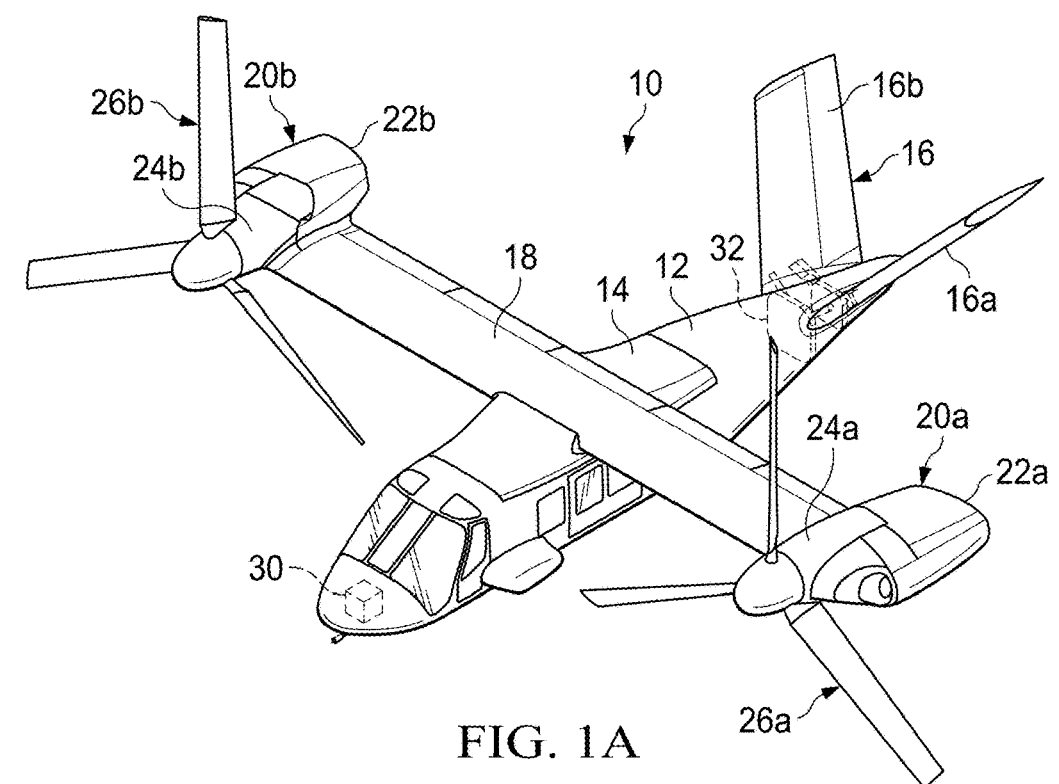
FIGS. 1A-1B are schematic illustrations of a tiltrotor aircraft having a dynamically tuned tail assembly in accordance with embodiments of the present disclosure.
Figure 1B:
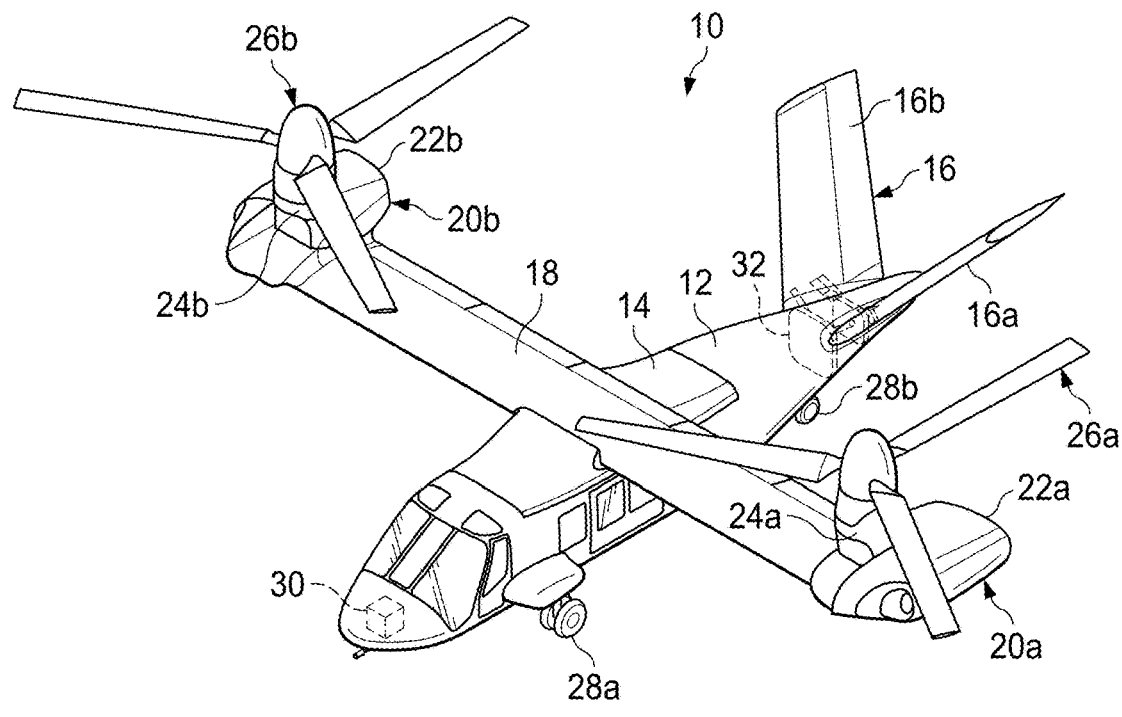

Referring to FIGS. 1A-1B in the drawings, a rotorcraft depicted as a tiltrotor aircraft having a dynamically tuned tail assembly is schematically illustrated and generally designated 10. Tiltrotor aircraft 10 includes a fuselage 12, a wing mount assembly 14 and a dynamically tuned tail assembly 16 that is depicted as including two oppositely disposed stabilizers 16a, 16b in the form of a V-tail assembly. Stabilizers 16a, 16b provide horizontal and/or vertical stabilization during forward flight and may have one or more moveable flight control surfaces that may function as rudders and/or elevators. Even though stabilizers 16a, 16b have been depicted and described as being part of a V-tail assembly, it should be understood by those having ordinary skill in the art that the stabilizers of the present embodiments are equally well suited for use as horizontal stabilizers and vertical stabilizers or as part of an X-tail assembly, a Y-tail assembly, an inverted V-tail assembly or other tail assembly configurations.

A wing assembly 18 is supported by wing mount assembly 14. Coupled proximate the outboard ends of wing assembly 18 are propulsion assemblies 20a, 20b. Propulsion assembly 20a includes a fixed nacelle 22a that houses an engine and a transmission. In addition, propulsion assembly 20a includes a pylon assembly 24a that is rotatable relative to fixed nacelle 22a, wing assembly 18 and fuselage 12 between a generally horizontal orientation, as best seen in FIG. 1A and a generally vertical orientation, as best seen in FIG. 1B. Pylon assembly 24a includes a rotor assembly depicted as proprotor assembly 26a that includes a rotor hub with three proprotor blades radiating therefrom and that is rotatable responsive to torque and rotational energy provided via a drive system mechanically coupled to the engine and transmission housed by fixed nacelle 22a. Similarly, propulsion assembly 20b includes a fixed nacelle 22b that houses an engine and a transmission. In addition, propulsion assembly 20b includes a pylon assembly 24b that is rotatable relative to fixed nacelle 22b, wing assembly 18 and fuselage 12 between a generally horizontal orientation, as best seen in FIG. 1A and a generally vertical orientation, as best seen in FIG. 1B. Pylon assembly 24b includes a rotor assembly depicted as proprotor assembly 26b that includes a rotor hub with three proprotor blades radiating therefrom and that is rotatable responsive to torque and rotational energy provided via a drive system mechanically coupled to the engine and transmission housed by fixed nacelle 22b.

FIG. 1A illustrates tiltrotor aircraft 10 in airplane or forward flight mode, in which proprotor assemblies 26a, 26b are rotating in a substantially vertical plane to provide a forward thrust enabling wing assembly 18 to provide a lifting force responsive to forward airspeed, such that tiltrotor aircraft 10 flies much like a conventional propeller driven aircraft. FIG. 1B illustrates tiltrotor aircraft 10 in helicopter or vertical takeoff and landing (VTOL) flight mode, in which proprotor assemblies 26a, 26b are rotating in a substantially horizontal plane to provide a lifting thrust, such that tiltrotor aircraft 10 flies much like a conventional helicopter. It should be appreciated that tiltrotor aircraft 10 can be operated such that proprotor assemblies 26a, 26b are selectively positioned between forward flight mode and VTOL flight mode, which can be referred to as a conversion flight mode. Even though tiltrotor aircraft 10 has been described as having one engine in each fixed nacelle 22a, 22b, it should be understood by those having ordinary skill in the art that other engine arrangements are possible and are considered to be within the scope of the present disclosure including, for example, having one or more engines housed within fuselage 12 that provide torque and rotational energy to proprotor assemblies 26a, 26b.

Even though proprotor assemblies 26a, 26b have been depicted and described as having three proprotor blades, it should be understood by those having ordinary skill in the art that the proprotor assemblies of the present embodiments could have other numbers of proprotor blades both greater than or less than three including proprotor assemblies having two, four, five or more proprotor blades. Tiltrotor aircraft 10 has a landing gear system including two front landing gear 28a, only the left front landing gear being visible in FIG. 1B, and an aft landing gear 28b that provide ground support for tiltrotor aircraft 10. The position of pylon assemblies 24a, 24b, the angular velocity or revolutions per minute (RPM) of the proprotor assemblies 26a, 26b, the pitch of the proprotor blades and the like are determined using a flight control system 30, with or without pilot input, to selectively control the direction, thrust and lift of tiltrotor aircraft 10 during flight.

Aircraft rotor assemblies, such as proprotor assemblies 26a, 26b, are rotated to generate thrust. A parasitic byproduct of the rotation of aircraft rotor assemblies is the generation of certain low frequency vibrations referred to herein as excitation frequencies. In the case of proprotor assemblies 26a, 26b that have three proprotor blades, two of the dominant excitation frequencies correspond to 1/rev (1 per revolution) and 3/rev (3 per revolution). Stated more generally, two of the dominant excitation frequencies generated by a rotating rotor assembly are 1/rev and n/rev, where n is equal to the number of rotor blades of the rotor assembly. In the present tiltrotor embodiment, if a proprotor assembly has an operating speed of 360 RPM, the corresponding 1/rev excitation frequency is 6 Hertz (360/60=6 Hz). Similarly, at an operating speed of 360 RPM, the corresponding 3/rev excitation frequency is 18 Hz (360/60×3=18 Hz). It should be understood by those having ordinary skill in the art that a change in the operating speed of a proprotor assembly will result in a proportional change in the excitation frequencies generated by the proprotor assembly. For tiltrotor aircraft, flight in airplane mode typically requires less thrust than flight in helicopter mode. One way to reduce thrust as well as increase endurance, reduce noise levels and reduce fuel consumption is to reduce the operating speed of the proprotor assemblies. For example, in helicopter mode, the tiltrotor aircraft may operate at or near the 100 percent design RPM, but in airplane mode, the tiltrotor aircraft may operate at a reduced percent of design RPM.

During the design and development phase of tiltrotor aircraft, considerable attention is given to ensuring that the natural frequencies of major airframe components and assemblies are sufficiently separated from the excitation frequencies generated by the rotating components. This process not only ensures that the dynamic environment of the aircraft is acceptable for passengers and crew but also, that the aircraft components can operate together safely and have adequate fatigue life. In the case of tiltrotor aircraft 10, the frequency placement of components such as fuselage 12 and tail assembly 16 is important as the natural frequencies or modes of these components must be sufficiently separated from the critical excitation frequencies of 1/rev and n/rev generated by proprotor assemblies 26a, 26b. It has been determined that the connections between components such as fuselage 12 and tail assembly 16 must be considered when analyzing dynamic responses to the critical excitation frequencies. For example, the stiffness or compliance of the connection between fuselage 12 and tail assembly 16 contributes to the modes of each. In the present embodiments, favorable changes in the modal frequencies and the dynamic response of tail assembly 16 is achieved by tailoring the axial stiffness and bending stiffness of a connection system 32 between fuselage 12 and tail assembly 16 to independently tune the chordwise pivot mode and the beamwise bending mode of stabilizers 16a, 16b. In other words, tailoring the axial stiffness and bending stiffness of connection system 32 is used to alter the natural frequencies of stabilizers 16a, 16b to avoid the critical excitation frequencies generated by proprotor assemblies 26a, 26b. In addition, independently tailoring the axial stiffness and bending stiffness of connection system 32 decouples the chordwise pivot mode and the beamwise bending mode of stabilizers 16a, 16b which favorably influences aeroelastic stability.

It should be appreciated that tiltrotor aircraft 10 is merely illustrative of a variety of aircraft that can implement the embodiments disclosed herein. Indeed, a dynamically tuned tail assembly may be implemented on any aircraft. Other aircraft implementations can include hybrid aircraft, tiltwing aircraft, quad tiltrotor aircraft, helicopters, unmanned aircraft, gyrocopters, propeller-driven airplanes, compound helicopters, drones, fixed wing aircraft and the like. As such, those having ordinary skill in the art will recognize that a dynamically tuned tail assembly can be integrated into a variety of aircraft configurations. It should be appreciated that even though aircraft are particularly well suited to implement the embodiments of the present disclosure, non-aircraft vehicles and devices can also implement the embodiments.

Figure 2:
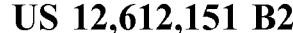
FIG. 2 is an isometric view of an aft portion of a tiltrotor aircraft having a dynamically tuned tail assembly in accordance with embodiments of the present disclosure.

Referring additionally to FIG. 2 in the drawings, a dynamically tuned tail assembly 16 is coupled to an aft end or tail cone of fuselage 12. Tail assembly 16 including two oppositely disposed stabilizers 16a, 16b in the form of a V-tail assembly. In the illustrated embodiment, stabilizer 16a is coupled to a forward bulkhead 40 of fuselage 12 at a forward joint 42a. In addition, stabilizer 16a is coupled to an aft bulkhead 44 of fuselage 12 at an aft joint 46*a*. Likewise, stabilizer 16*b* is coupled to forward bulkhead 40 of fuselage 12 at a forward joint 42*b*. In addition, stabilizer 16*b* is coupled to aft bulkhead 44 of fuselage 12 at an aft joint 46*b*. Forward bulkhead 40 and aft bulkhead 44 are structural members of fuselage 12 and form a portion of the airframe of tiltrotor aircraft 10. Forward bulkhead 40 and aft bulkhead 44 may be formed from strong and lightweight materials including, but not limited to, metals such as aluminum or titanium, composites such as fiber reinforced polymers and/or carbon based materials to provide the desired strength and stiffness characteristics to fuselage 12.

Figure 3:
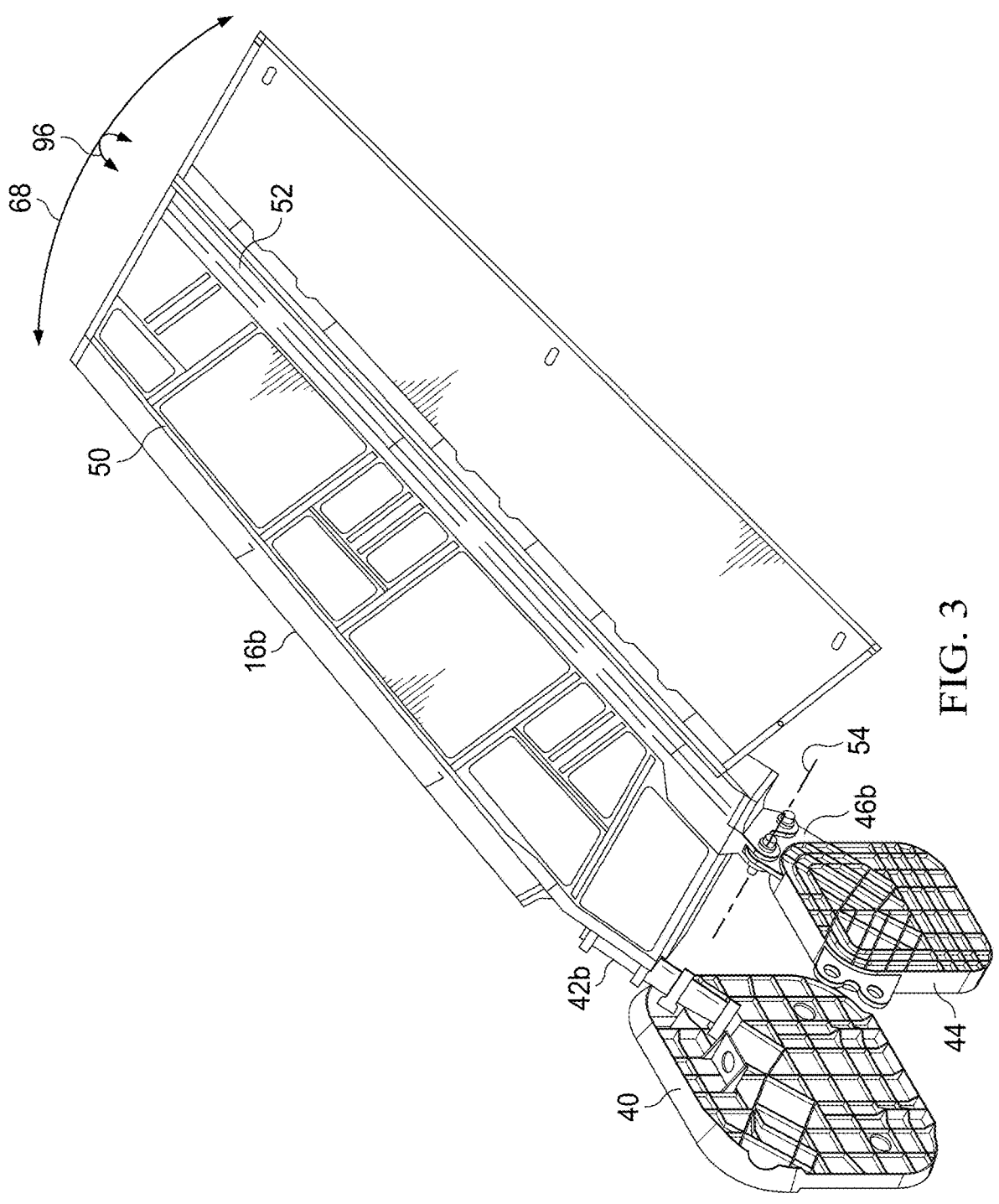
FIG. 3 is an isometric view of a stabilizer coupled to a pair of fuselage bulkheads for a dynamically tuned tail assembly of a tiltrotor aircraft in accordance with embodiments of the present disclosure.

Referring now to FIG. 3 in the drawings, the connection of stabilizer 16*b* to forward bulkhead 40 and aft bulkhead 44 is shown in greater detail. The connection of stabilizer 16*b* to forward bulkhead 40 and aft bulkhead 44 is substantially similar to the connection of stabilizer 16*a* to forward bulkhead 40 and aft bulkhead 44 therefore, for sake of efficiency, certain features will be disclosed only with regard to the connection of stabilizer 16*b* to forward bulkhead 40 and aft bulkhead 44. One having ordinary skill in the art, however, will fully appreciate an understanding of the connection of stabilizer 16*a* to forward bulkhead 40 and aft bulkhead 44 based upon the disclosure herein of the connection of stabilizer 16*b* to forward bulkhead 40 and aft bulkhead 44. Stabilizer 16*b* includes a forward spar 50 and an aft spar 52 that together with ribs, the skin (removed in FIG. 3) and other structural elements provide strength and rigidity to stabilizer 16*b* such that stabilizer 16*b* is configured to perform the desired stabilizing functionality during forward flight. In the illustrated embodiment, aft joint 46*b* couples aft spar 52 to aft bulkhead 44 of fuselage 12 and forward joint 42*b* couples forward spar 50 to forward bulkhead 40 of fuselage 12. Aft joint 46*b* defines a pitch axis 54 about which stabilizer 16*b* pivots. Forward joint 42*b* has an axial stiffness configured to tailor a chordwise pivot mode of stabilizer 16*b* and a bending stiffness configured to tailor a beamwise bending mode of stabilizer 16*b*. In one non-limiting example, the chordwise pivot mode of stabilizer 16*b* is below the 3/rev excitation frequency (such as between 0.80 and 0.95 times the 3/rev excitation frequency), the beamwise bending mode of stabilizer 16*b* is above the 1/rev excitation frequency (such as between 1.05 and 1.20 times the 1/rev excitation frequency) and the chordwise pivot mode of stabilizer 16*b* is decoupled from the beamwise bending mode of stabilizer 16*b*.

Figure 4A:
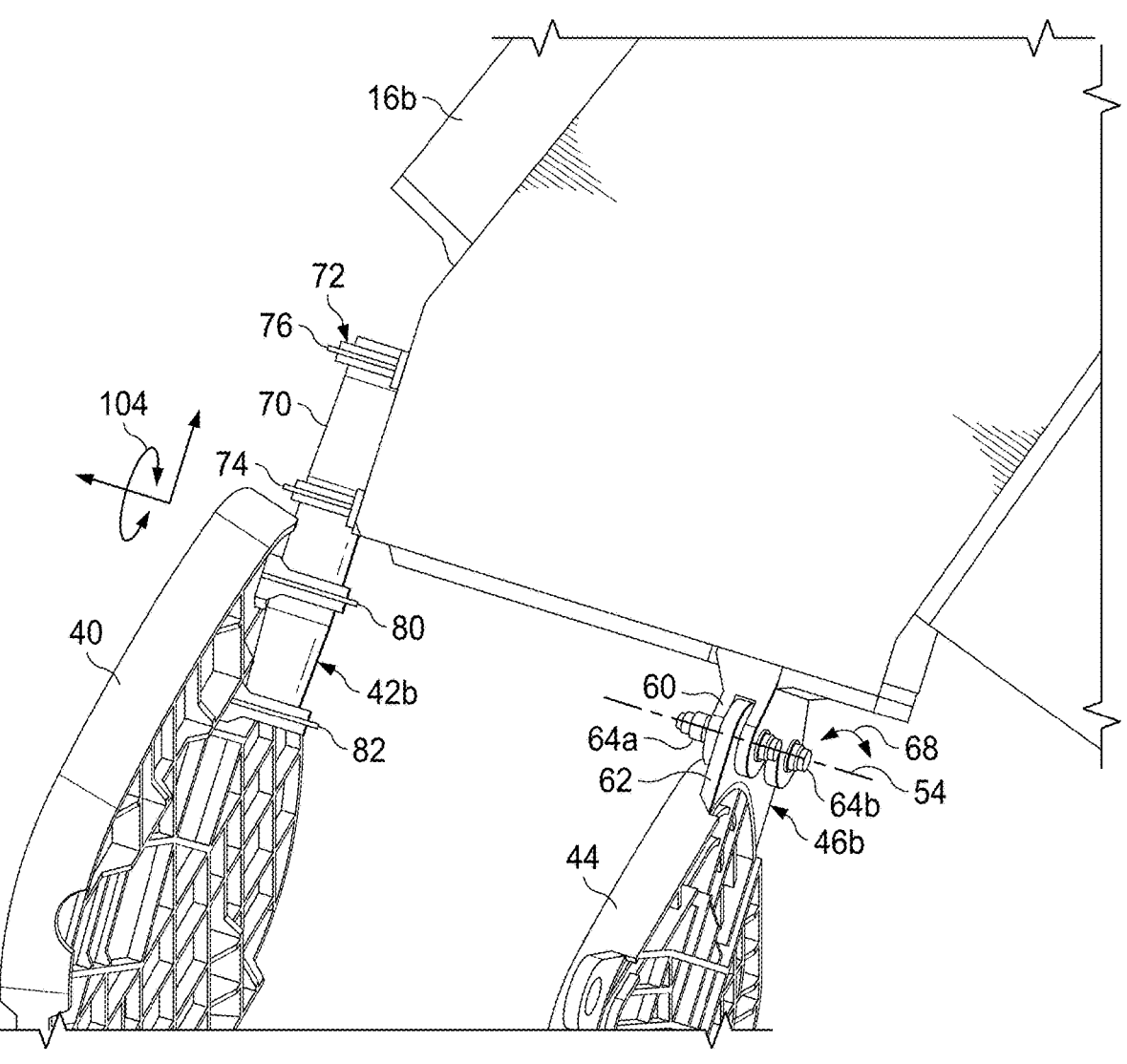
FIGS. 4A-4B are isometric and cross sectional views depicting forward and aft joints of a dynamically tuned tail assembly for a tiltrotor aircraft in accordance with embodiments of the present disclosure.
Figure 4B:
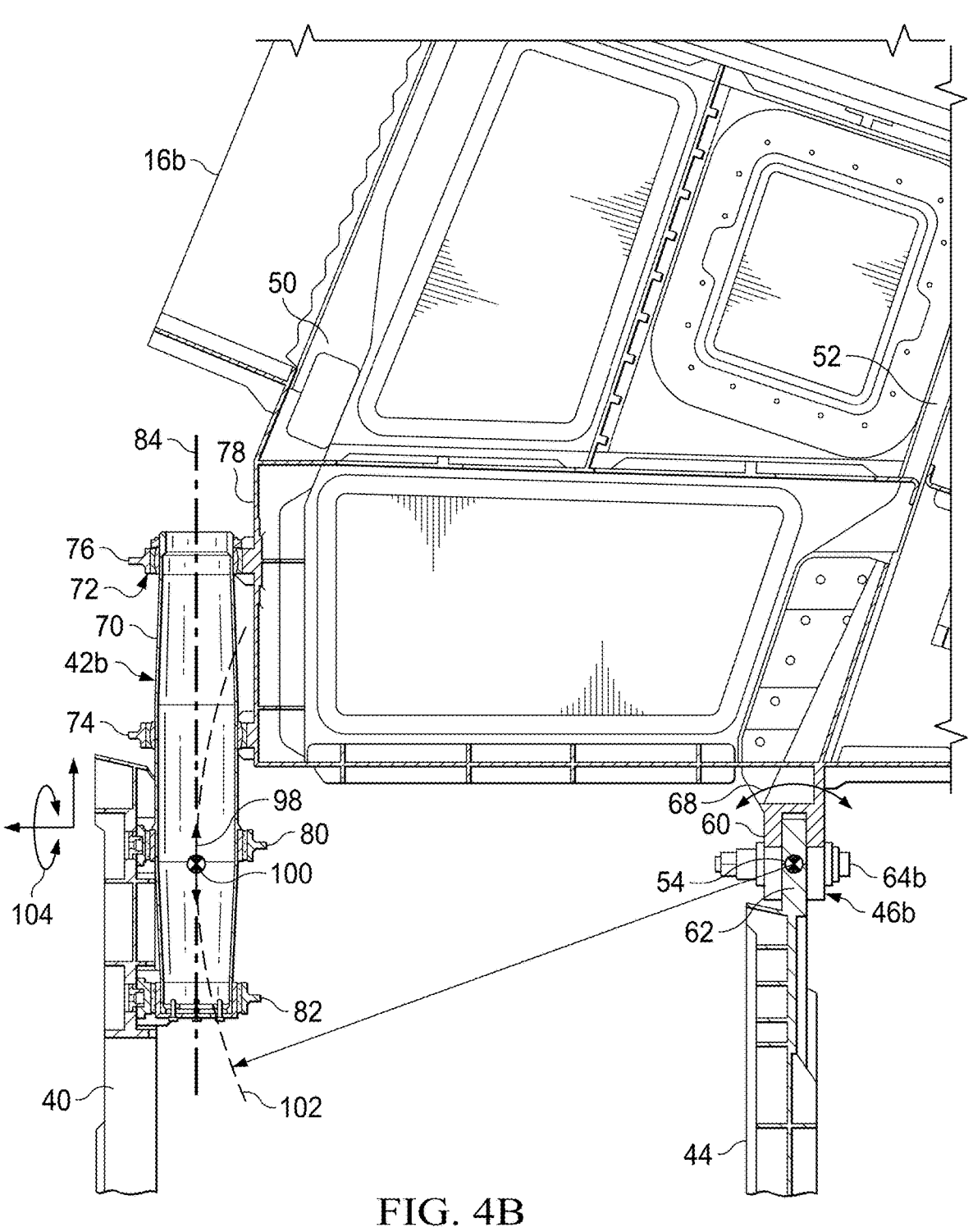

Referring additionally to FIGS. 4A-4B in the drawings, the construction of aft joint 46*b* and forward joint 42*b* will now be discussed. In the illustrated embodiment, aft joint 46*b* includes a clevis fitting 60 that is integral with or coupled to aft spar 52 using fasteners, welding, adhesives or other suitable coupling means. Clevis fitting 60 may be formed from strong and/or rigid materials including, but not limited to, metals such as aluminum or titanium, composites such as fiber reinforced polymers and/or carbon based materials. Aft joint 46*b* also includes a lug fitting 62 that is integrally coupled to aft bulkhead 44 and thus formed from the same materials as aft bulkhead 44. In other embodiments, lug fitting 62 may a separate part that is coupled to aft bulkhead 44 using fasteners, welding, adhesives or other suitable coupling means. In the illustrated embodiment, lug fitting 62 is received within clevis fitting 60 and is coupled thereto using a pair of spherical bearing assemblies 64*a*, 64*b*. More specifically, lug fitting 62 includes a pair of apertures each receiving a spherical bearing element therein. The openings of the two spherical bearing elements are aligned with openings of clevis fitting 60 when lug fitting 62 is received within clevis fitting 60. Two bolts are then extended through the respective aligned openings of the spherical bearing elements and clevis fitting 60 and secured thereto with locking nut systems to form spherical bearing assemblies 64*a*, 64*b*. Once assembled, spherical bearing assemblies 64*a*, 64*b* of aft joint 46*b* allow clevis fitting 60 to pivot relative to lug fitting 62 about pitch axis 54 which in turn allows stabilizer 16*b* to pivot about pitch axis 54 in a chordwise direction as indicated by arrow 68. In other embodiments, pitch axis 54 could be established with a hinge line, a flex beam or other suitable means and may alternatively be a virtual pitch axis.

In the illustrated embodiment, forward joint 42*b* includes a shaft 70 that is coupled to forward spar 50 via a bearing assembly 72 that includes a pair of outboard bearings 74, 76 and a mounting bracket 78 that couples to forward spar 50 using fasteners, welding, adhesives or other suitable coupling means. Shaft 70 is also coupled to forward bulkhead 40 of fuselage 12 by a pair of inboard bearings 80, 82 that are coupled to forward bulkhead 40 using fasteners, such as bolts.

Outboard bearings 74, 76 and inboard bearings 80, 82 may be press fit on or otherwise coupled to shaft 70. Shaft 70 is a round tubular shaft such as a generally cylindrical hollow shaft that is depicted as a generally cylindrical tapered hollow shaft having a progressively larger diameter from the ends toward the middle. Shaft 70 may be formed from a high strength material including, but not limited to, metals such as steels, stainless steels, aluminum alloys or other suitable material. Various characteristics of shaft 70, such as the material, the wall thickness and the shape of shaft 70, may be tailored to achieve the desired bending stiffness. Shaft 70 has a central axis 84 that extends in an axial direction through shaft 70.

Figure 5:
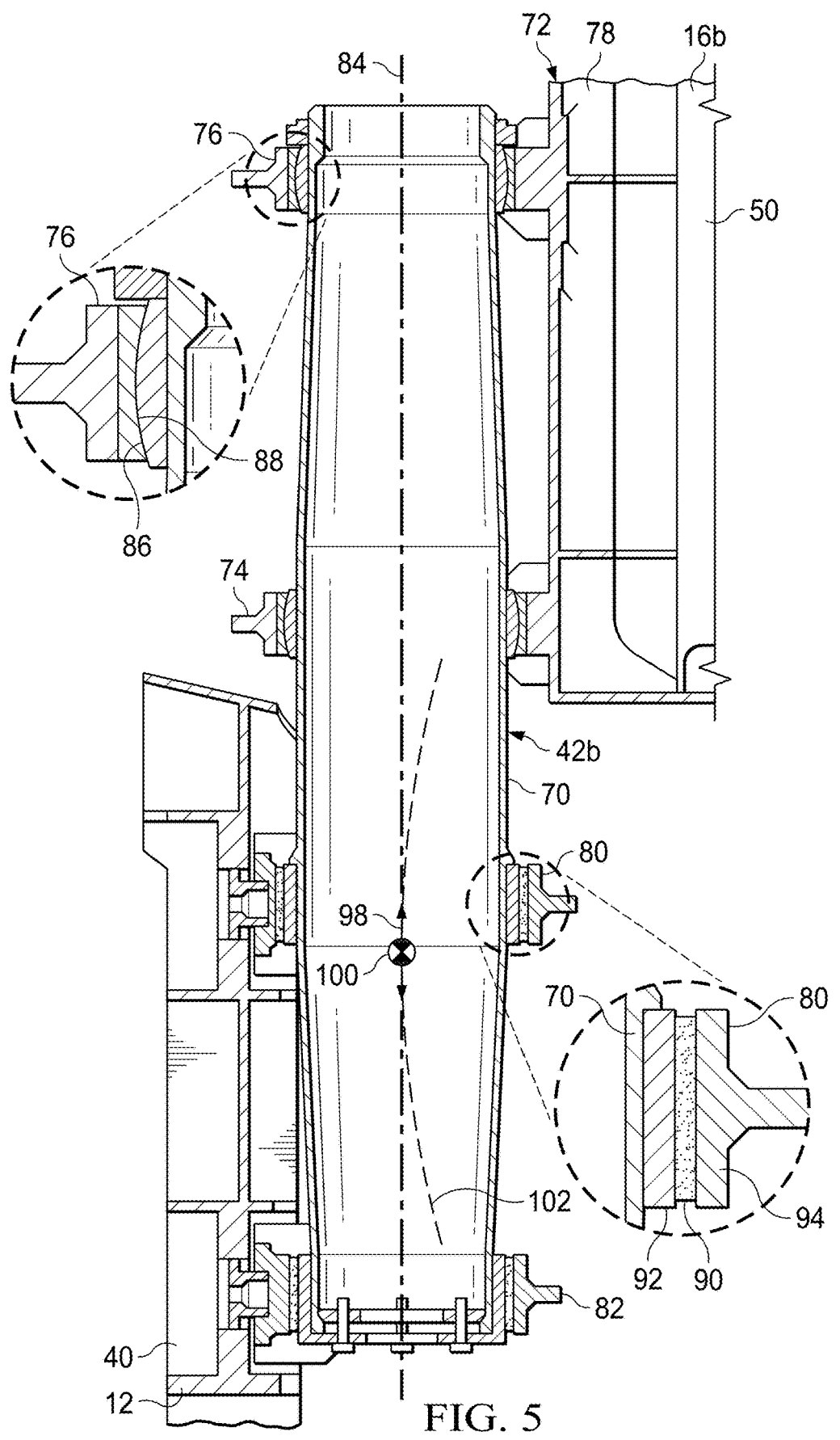
FIG. 5 is a cross sectional view of a forward joint of a dynamically tuned tail assembly for a tiltrotor aircraft in accordance with embodiments of the present disclosure.

In the illustrated embodiment, outboard bearings 74, 76 are spherical bearings and inboard bearings 80, 82 are elastomeric journal bearings. Outboard bearings 74, 76 have cooperating spherical surfaces, such as surface 86 and surface 88 of outboard bearing 76 (see blow-up section in FIG. 5), that allow shaft 70 to have a tilting degree of freedom relative to stabilizer 16*b* at the locations of outboard bearings 74, 76. In other embodiments, outboard bearings 74, 76 could be cylindrical bushings, fixed mounts or other suitable connections. Inboard bearings 80, 82 include an elastomeric layer disposed between inner and outer metal rings, such as elastomeric layer 90 disposed between inner ring 92 and outer ring 94 of inboard bearing 80 (see blow-up section in FIG. 5). In other embodiments, inboard bearings may have a series of elastomeric layers separated by inelastic shims disposed between inner and outer metal rings. The elastomeric layer may be formed from a polymer that has viscoelasticity including elastomers such as rubber. The connections between the elastomeric layer and the metal rings of inboard bearings 80, 82 are permanent and may be made by vulcanizing the elastomeric material to the adjacent surfaces or by bonded, adhered or otherwise secured the elastomeric material in a non-removable manner to these surfaces. The durometer and thickness of the elastomeric material may be tailored to determine the axial stiffness, softness and/or spring rate of inboard bearings 80, 82 to enable shaft 70 to have an axial motion degree of freedom relative to forward bulkhead 40. In addition, the durometer and thickness of the elastomeric material may be tailored to determine the radial stiffness of inboard bearings 80, 82.

Still referring to FIGS. 4A-4B in the drawings, the operation of aft joint 46*b* and forward joint 42*b* will now be discussed. During flight, stabilizer 16b is subject to the 1/rev and 3/rev excitation frequencies generated by proprotor assemblies 26a, 26b. Due at least in part to its materials and geometry, stabilizer 16b tends to oscillate or vibrate with one or both of a chordwise pivot motion, as indicated by arrows 68, and a beamwise bending motion, as indicated by arrows 96 (see FIG. 3). Without proper dynamic tuning, the natural frequency of stabilizer 16b in the chordwise pivot motion, referred to herein as the chordwise pivot mode, may be undesirably close to the 3/rev excitation frequency generated by proprotor assemblies 26a, 26b. Likewise, without proper dynamic tuning, the natural frequency of stabilizer 16b in the beamwise bending motion, referred to herein as the beamwise bending mode, may be undesirably close to the 1/rev excitation frequency generated by proprotor assemblies 26a, 26b. If the chordwise pivot mode of stabilizer 16b becomes coupled with the 3/rev excitation frequency and/or the beamwise bending mode of stabilizer 16b becomes coupled with the 1/rev excitation frequencies, stabilizer 16b and/or fuselage 12 could experience undesirable resonant vibration and/or aeroelastic instability. In the present embodiments, to avoid these outcomes, the axial stiffness of forward joint 42b is configured to tailor the chordwise pivot mode of stabilizer 16b below the 3/rev excitation frequency and the bending stiffness of forward joint 42b is configured to tailor the beamwise bending mode of stabilizer 16b above the 1/rev excitation frequency which not only prevents stabilizer 16b from experiencing undesirable resonant vibrations, but also decouples the chordwise pivot mode of stabilizer 16b from the beamwise bending mode of stabilizer 16b which favorably influences the aeroelastic stability of stabilizer 16b.

This is achieved by allowing stabilizer 16b to pivot about pitch axis 54 of forward joint 46b while tuning the magnitude and frequency of the chordwise pivot motion 68 based upon the elastomeric properties of inboard bearings 80, 82 of forward joint 42b. More specifically, the axial motion of shaft 70 relative to bulkhead 40, as indicated by arrows 98, is controlled by the axial stiffness of inboard bearings 80, 82, which in turn control the chordwise pivot motion 68 of stabilizer 16b. As best seen in FIG. 4B, by positioning the tangent point 100 of axis 84 and an arc of rotation 102 about pitch axis 54 at a location inboard of outboard bearings 74, 76 and preferably at a location between inboard bearings 80, 82, the chordwise pivot motion 68 of stabilizer 16b effectively becomes axially motion 98 of shaft 70 relative to bulkhead 40 for the distances involved. In the present embodiments, the chordwise pivot mode of stabilizer 16b is tuned below the 3/rev excitation frequency by softening or reducing the axial stiffness of forward joint 42b based upon the elastomeric properties of inboard bearings 80, 82. Even though the chordwise pivot mode of stabilizer 16b has been described as being tuned below the 3/rev excitation frequency, it should be understood by those having ordinary skill in the art that adjusting the axial stiffness of the forward joint may be used to tailor the chordwise pivot mode of a stabilizer above, below or otherwise away from other frequencies of interest.

Tuning the frequency of beamwise bending motion 96 of stabilizer 16b is substantially independent of the axial stiffness of forward joint 42b and is based primarily upon the characteristics of shaft 70 as well as the radial stiffness of inboard bearings 80, 82 which together determine the bending stiffness of forward joint 42b. More specifically, the bending motion of shaft 70 relative to bulkhead 40, as indicated by arrows 104, is controlled by the bending stiffness of shaft 70 and the radial stiffness of inboard bearings 80, 82, which in turn control the beamwise bending motion 96 of stabilizer 16b. In the present embodiments, the beamwise bending mode of stabilizer 16b is tuned above the 1/rev excitation frequency by increasing the bending stiffness of forward joint 42b based upon the characteristics of shaft 70 and the radial stiffness of inboard bearings 80, 82. Even though the beamwise bending mode of stabilizer 16b has been described as being tuned above the 1/rev excitation frequency, it should be understood by those having ordinary skill in the art that adjusting the bending stiffness of the forward joint may be used to tailor the beamwise bending mode of a stabilizer above, below or otherwise away from other frequencies of interest.

Figure 6:
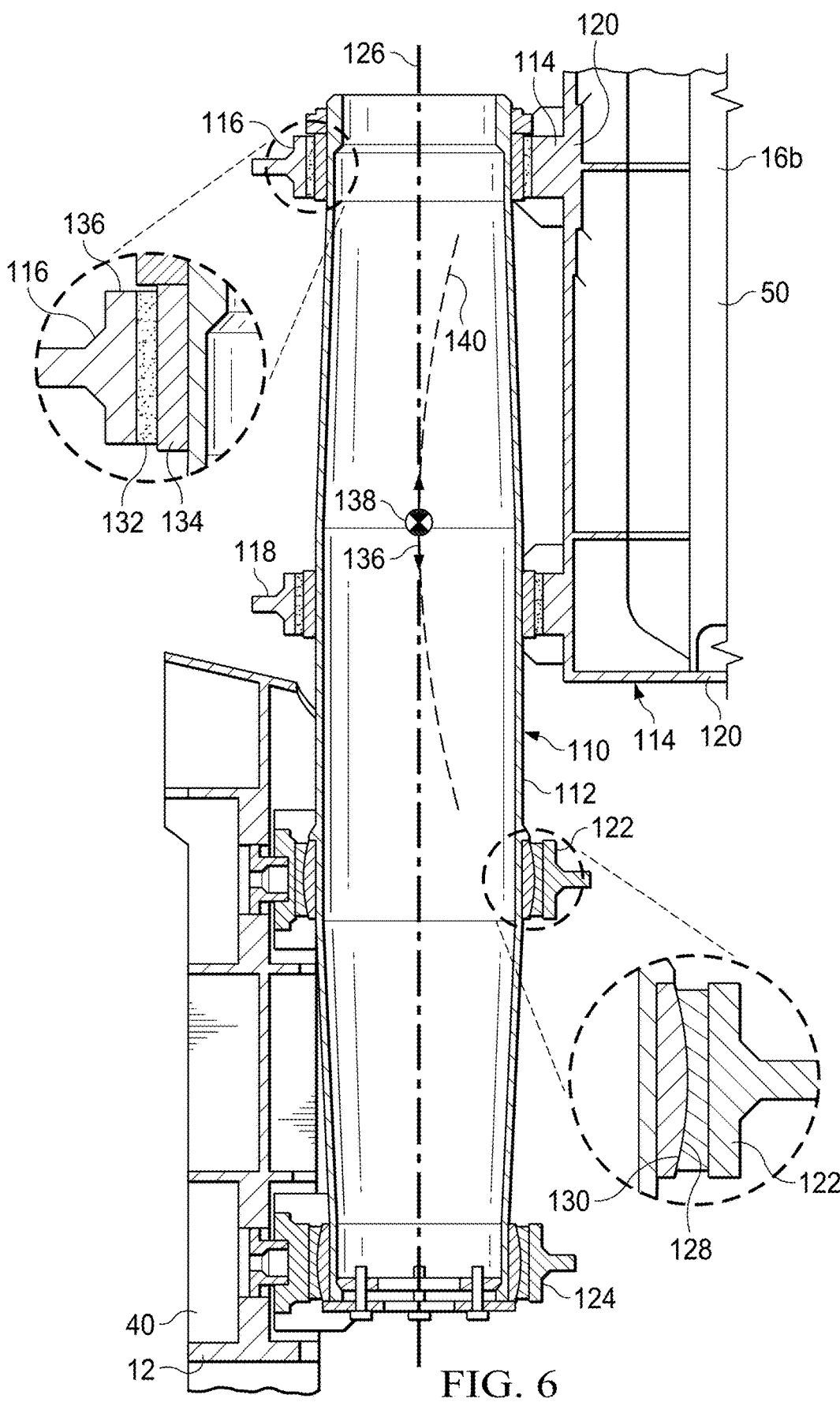
FIG. 6 is a cross sectional view of a forward joint of a dynamically tuned tail assembly for a tiltrotor aircraft in accordance with embodiments of the present disclosure.

Referring now to FIG. 6 of the drawings, an alternate configuration of a forward joint will now be discussed. In the illustrated embodiment, forward joint 110 includes a shaft 112 that is coupled to forward spar 50 of stabilizer 16b via a bearing assembly 114 that includes a pair of outboard bearings 116, 118 and a mounting bracket 120 that couples to forward spar 50 using fasteners, welding, adhesives or other suitable coupling means. Shaft 112 is also coupled to forward bulkhead 40 of fuselage 12 by a pair of inboard bearings 122, 124 that are coupled to forward bulkhead 40 using fasteners, such as bolts. Outboard bearings 116, 118 and inboard bearings 122, 124 may be press fit on or otherwise coupled to shaft 112, which may be similar in construction to shaft 70 discussed herein. Shaft 112 has a central axis 126 that extends in an axial direction through shaft 112.

In the illustrated embodiment, inboard bearings 122, 124 are spherical bearings and outboard bearings 116, 118 are elastomeric journal bearings. Inboard bearings 122, 124 have cooperating spherical surfaces, such as surface 128 and surface 130 of inboard bearing 122 (see blow-up section), that allow shaft 112 to have a tilting degree of freedom relative to forward bulkhead 40 at the locations of inboard bearings 122, 124. In other embodiments, inboard bearings 122, 124 could be cylindrical bushings, fixed mounts or other suitable connections. Outboard bearings 116, 118 include an elastomeric layer disposed between inner and outer metal rings, such as elastomeric layer 132 disposed between inner ring 134 and outer ring 136 of outboard bearing 116 (see blow-up section). The durometer and thickness of the elastomeric material may be tailored to determine the axial stiffness, softness and/or spring rate of outboard bearings 116, 118 to enable shaft 112 to have an axial motion degree of freedom relative to stabilizer 16b. In addition, the durometer and thickness of the elastomeric material may be tailored to determine the radial stiffness of outboard bearings 116, 118. In the present embodiment, the axial stiffness of forward joint 110 is configured to tailor the chordwise pivot mode of stabilizer 16b below the 3/rev excitation frequency and the bending stiffness of forward joint 110 is configured to tailor the beamwise bending mode of stabilizer 16b above the 1/rev excitation frequency which not only prevents stabilizer 16b from experiencing undesirable resonant vibrations, but also decouples the chordwise pivot mode of stabilizer 16b from the beamwise bending mode of stabilizer 16b which favorably influences the aeroelastic stability of stabilizer 16b.

This is achieved by allowing stabilizer 16b to pivot about the pitch axis of an aft joint, such forward joint 46b discussed herein, while tuning the magnitude and frequency of the chordwise pivot motion based upon the elastomeric properties of outboard bearings 116, 118 of forward joint 110. More specifically, the axial motion of shaft 112 relative to stabilizer 16b, as indicated by arrows 136, is controlled by outboard bearings 116, 118, which in turn control the chordwise pivot motion of stabilizer 16b. It is noted that by positioning the tangent point 138 of axis 126 and an arc of rotation 140 about the pitch axis of the aft joint at a location outboard of inboard bearings 122, 124 and preferably at a location between outboard bearings 116, 118, the chordwise pivot motion of stabilizer 16b effectively becomes axially motion 136 of shaft 112 relative to stabilizer 16b for the distances involved. In the present embodiments, the chordwise pivot mode of stabilizer 16b is tuned below the 3/rev excitation frequency by softening or reducing the axial stiffness of forward joint 110 based upon the elastomeric properties of outboard bearings 116, 118. Tuning the frequency of beamwise bending motion of stabilizer 16b is substantially independent of the axial stiffness of forward joint 110 and is based primarily upon the characteristics of shaft 112 as well as the radial stiffness of outboard bearings 116, 118 which together determine the bending stiffness of aft joint 110. More specifically, the bending motion of shaft 112 relative to bulkhead 40 is controlled by the bending stiffness of shaft 112 and the radial stiffness of outboard bearings 116, 118, which in turn control the beamwise bending motion of stabilizer 16b. In the present embodiments, the beamwise bending mode of stabilizer 16b is tuned above the 1/rev excitation frequency by increasing the bending stiffness of forward joint 110 based upon the characteristics of shaft 112 and the radial stiffness of outboard bearings 116, 118.

The foregoing description of embodiments of the disclosure has been presented for purposes of illustration and description. It is not intended to be exhaustive or to limit the disclosure to the precise form disclosed, and modifications and variations are possible in light of the above teachings or may be acquired from practice of the disclosure. The embodiments were chosen and described in order to explain the principals of the disclosure and its practical application to enable one having ordinary skill in the art to utilize the disclosure in various embodiments and with various modifications as are suited to the particular use contemplated. Other substitutions, modifications, changes and omissions may be made in the design, operating conditions and arrangement of the embodiments without departing from the scope of the present disclosure. Such modifications and combinations of the illustrative embodiments as well as other embodiments will be apparent to persons having ordinary skill in the art upon reference to the description. It is, therefore, intended that the appended claims encompass any such modifications or embodiments.

What is claimed is:

1. A tail assembly for a rotorcraft having a fuselage, the tail assembly comprising:
   a stabilizer having an aft spar and a forward spar;
   an aft joint coupling the aft spar to the fuselage, the aft joint defining a pitch axis such that the aft joint allows the stabilizer to pivot about the pitch axis; and
   a forward joint coupling the forward spar to the fuselage, the forward joint having an axial stiffness configured to tailor a chordwise pivot mode of the stabilizer and a bending stiffness configured to tailor a beamwise bending mode of the stabilizer;
   wherein, the chordwise pivot mode of the stabilizer is decoupled from the beamwise bending mode of the stabilizer.

2. The tail assembly as recited in claim 1 wherein, the aft joint further comprises a clevis fitting coupled to one of the aft spar or the fuselage and a lug fitting coupled to the other of the aft spar or the fuselage; and wherein, the clevis fitting and the lug fitting are coupled together by at least one spherical bearing assembly such that the clevis fitting and the lug fitting allow the stabilizer to pivot about the pitch axis.

3. The tail assembly as recited in claim 1 wherein, the aft joint further comprises a clevis fitting coupled to one of the aft spar or the fuselage and a lug fitting coupled to the other of the aft spar or the fuselage; and
   wherein, the clevis fitting and the lug fitting are coupled together by first and second spherical bearing assemblies such that the clevis fitting and the lug fitting allow the stabilizer to pivot about the pitch axis.

4. The tail assembly as recited in claim 1 wherein, the forward joint further comprises a shaft coupled to the forward spar by first and second outboard bearings and coupled to the fuselage by first and second inboard bearings, the shaft having an axis extending in an axial direction.

5. The tail assembly as recited in claim 4 wherein, the shaft is a generally cylindrical hollow shaft.

6. The tail assembly as recited in claim 4 wherein, the shaft is a generally cylindrical tapered hollow shaft.

7. The tail assembly as recited in claim 4 wherein, the shaft is formed from a metal.

8. The tail assembly as recited in claim 4 wherein, the first and second outboard bearings are spherical bearings and the first and second inboard bearings are elastomeric journal bearings.

9. The tail assembly as recited in claim 8 wherein, the elastomeric journal bearings define the axial stiffness of the forward joint and allow axial motion of the shaft relative to the fuselage when the stabilizer pivots about the pitch axis.

10. The tail assembly as recited in claim 9 wherein, the shaft and the elastomeric journal bearings define the bending stiffness of the forward joint and allow beamwise bending motion of the stabilizer.

11. The tail assembly as recited in claim 8 wherein, the axis of the shaft is tangent to an arc of rotation about the pitch axis at a location between the elastomeric journal bearings.

12. The tail assembly as recited in claim 4 wherein, the axis of the shaft is tangent to an arc of rotation about the pitch axis at a location between the first and second inboard bearings.

13. The tail assembly as recited in claim 4 wherein, the axis of the shaft is tangent to an arc of rotation about the pitch axis at a location inboard of the first and second outboard bearings.

14. The tail assembly as recited in claim 4 wherein, the first and second outboard bearings are elastomeric journal bearings and the first and second inboard bearings are spherical bearings.

15. A rotorcraft comprising:
   a fuselage;
   a tail assembly coupled to the fuselage, the tail assembly comprising:
   a stabilizer having an aft spar and a forward spar;
   an aft joint coupling the aft spar to the fuselage, the aft joint defining a pitch axis such that the aft joint allows the stabilizer to pivot about the pitch axis; and
   a forward joint coupling the forward spar to the fuselage, the forward joint having an axial stiffness configured to tailor a chordwise pivot mode of the stabilizer and a bending stiffness configured to tailor a beamwise bending mode of the stabilizer;
   wherein, the chordwise pivot mode of the stabilizer is decoupled from the beamwise bending mode of the stabilizer.

16. The rotorcraft as recited in claim 15 wherein, the forward joint further comprises a shaft coupled to the forward spar by first and second outboard bearings and coupled to the fuselage by first and second inboard bearings;

wherein, the aft joint further comprises a clevis fitting coupled to one of the aft spar or the fuselage and a lug fitting coupled to the other of the aft spar or the fuselage; and wherein, the clevis fitting and the lug fitting are coupled together by first and second spherical bearing assemblies such that the clevis fitting and the lug fitting allow the stabilizer to pivot about the pitch axis.

17. The rotorcraft as recited in claim 15 wherein, the tail assembly is a V-tail assembly.

18. A tiltrotor aircraft comprising:

a fuselage;

a tail assembly coupled to the fuselage, the tail assembly comprising:

a stabilizer having an aft spar and a forward spar;

an aft joint coupling the aft spar to the fuselage, the aft joint defining a pitch axis such that the aft joint allows the stabilizer to pivot about the pitch axis; and a forward joint coupling the forward spar to the fuselage, the forward joint having an axial stiffness configured to tailor a chordwise pivot mode of the stabilizer and a bending stiffness configured to tailor a beamwise bending mode of the stabilizer;

wherein, the chordwise pivot mode of the stabilizer is decoupled from the beamwise bending mode of the stabilizer.

19. The tiltrotor aircraft as recited in claim 18 wherein, the forward joint further comprises a shaft coupled to the forward spar by first and second outboard bearings and coupled to the fuselage by first and second inboard bearings;

wherein, the aft joint further comprises a clevis fitting coupled to one of the aft spar or the fuselage and a lug fitting coupled to the other of the aft spar or the fuselage; and wherein, the clevis fitting and the lug fitting are coupled together by first and second spherical bearing assemblies such that the clevis fitting and the lug fitting allow the stabilizer to pivot about the pitch axis.

20. The tiltrotor aircraft as recited in claim 18 wherein, the tail assembly is a V-tail assembly.

* * * * *